F. A. YANTZ.
POTATO DIGGER.
APPLICATION FILED MAY 25, 1921.

1,427,145.

Patented Aug. 29, 1922.
3 SHEETS—SHEET 1.

Inventor
Franc. A. Yantz
by Jeffords & Dutton
Attorneys.

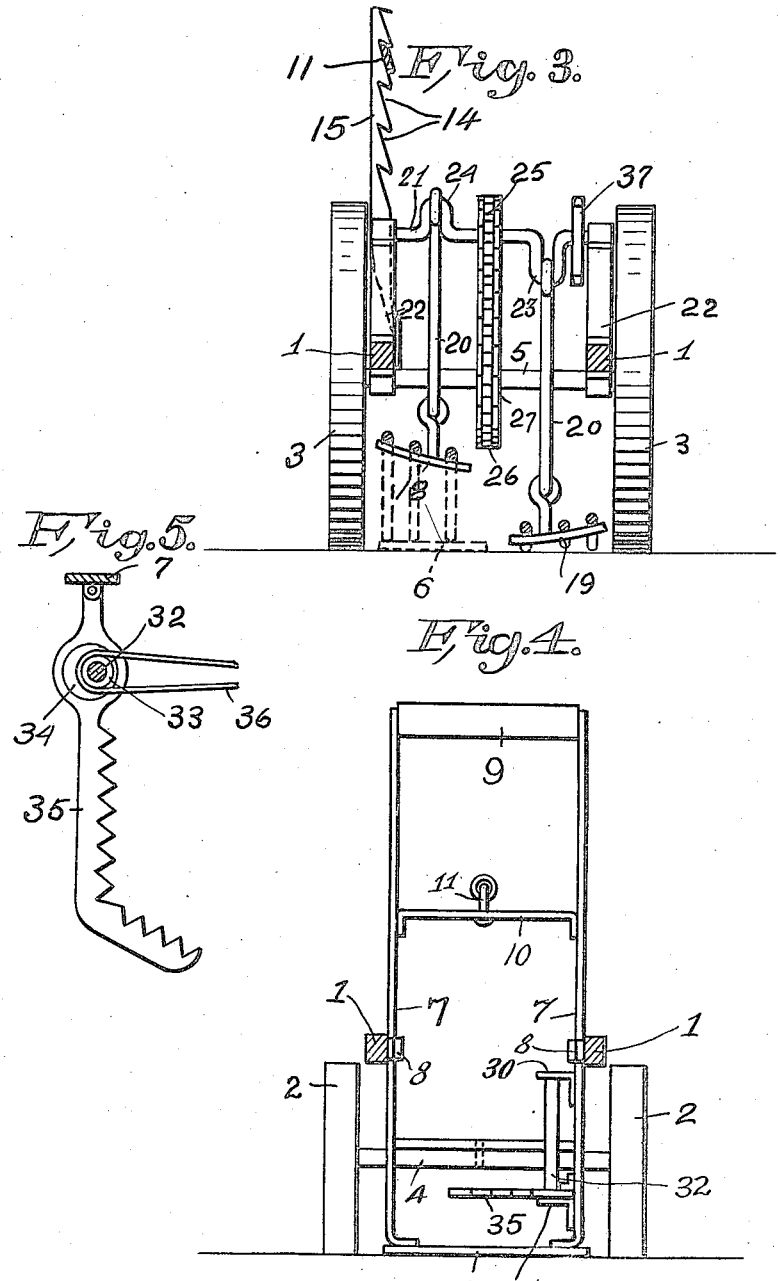

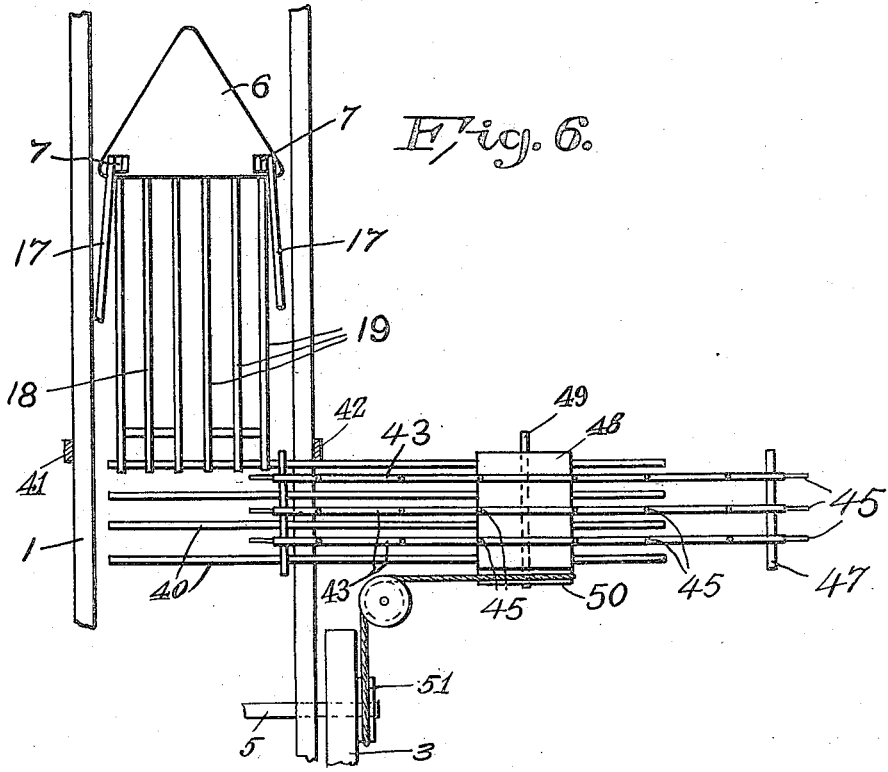
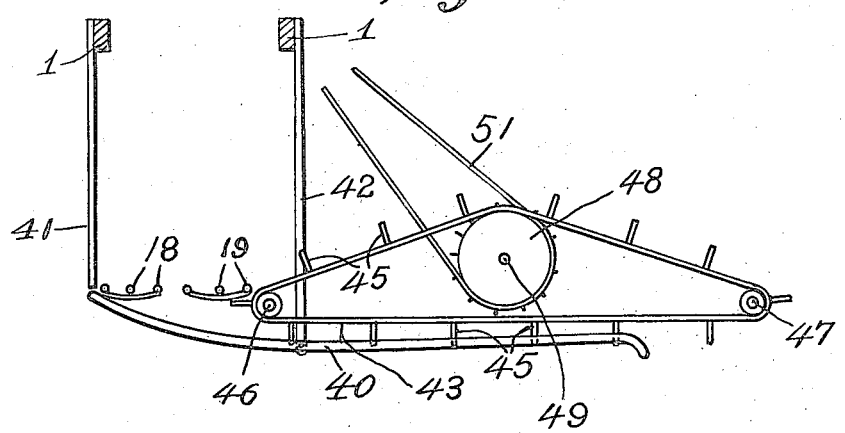

UNITED STATES PATENT OFFICE.

FRANC A. YANTZ, OF BURLINGTON, VERMONT.

POTATO DIGGER.

1,427,145.   Specification of Letters Patent.   Patented Aug. 29, 1922.

Application filed May 25, 1921. Serial No. 472,340.

*To all whom it may concern:*

Be it known that I, FRANC A. YANTZ, a citizen of the United States, residing at Burlington, in the county of Chittenden, State of Vermont, have invented certain new and useful Improvements in Potato Diggers, of which the following is a description, reference being had to the accompanying drawings, forming a part hereof.

My invention relates to potato-diggers of the type in which a plow passes under the potatoes lifting them so that they pass, with the earth enclosing them, to separating devices in rear of the plow by which they are separated from the earth and deposited on top of the ground in position to be subsequently gathered, and my invention has for its object to provide a potato-digger of this general type which will be simple, strong, inexpensive in construction and will be effective in operation. A further object of my invention is to provide in connection with a potato-digger of this type, special means for sweeping aside the potato tops and special means by which the potatoes may be delivered to one side of the path of the machine. A further object of the invention is to provide a potato-digger which will be adapted to be drawn by a single pair of horses or other draft animals.

With the above described objects and other objects hereinafter explained in view, my invention consists in the construction and combination of elements hereinafter described and claimed.

Referring to the drawings;

Figure 3 is a rear end view of the machine shown in Figures 1 and 2.

Figure 4 is a cross sectional view of the machine shown in Figures 1 and 2 on a vertical plane in rear of the vertical bars carrying the plow.

Figure 5 is an enlarged detail view of the device for sweeping aside the potato tops.

Figure 6 is a top plan view of the device for delivering the potatoes to one side of the path of movement of the machine, and Figure 7 is a side view of the device shown in Figure 6.

Figure 1:
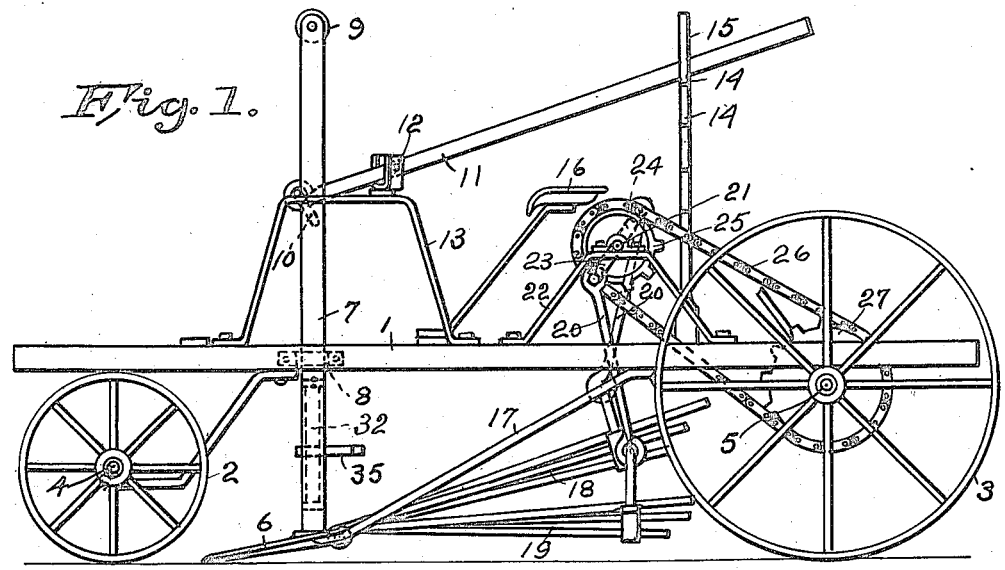
Figure 1 is a side view of a potato-digger embodying my invention except the device for delivering the potatoes at the side of the machine which is omitted for the sake of clearness.
Figure 2:
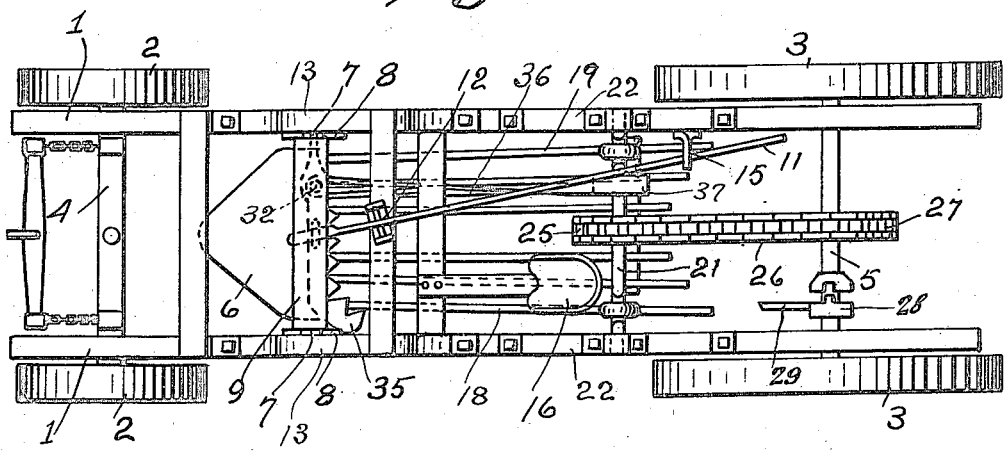
Figure 2 is a top plan view of the machine shown in Figure 1.

In the drawings 1 indicates the frame of the machine comprising suitable side bars and cross bars connecting them and is supported on front wheels 2 and rear wheels 3, the front wheels being mounted to rotate on axle 4 which is pivoted on a suitable king-bolt and is provided with the usual means for a pole (not shown) or other usual means for use with a pair of draft animals. The rear wheels, or at least one of them, are so secured on the rear axle 5 that the axle turns with them, or one of them.

6 indicates a broad, comparatively flat plow of triangular shape with its point extending forward and adapted, as the machine is drawn forward, to enter the ground beneath the potatoes and, by reason of its inclination, to cause the potatoes to be lifted, together with the earth enclosing them. This plow is secured on the lower ends of a pair of vertical bars 7 arranged to be vertically movable in guides 8 secured to the inner faces of the side bars of the frame. The lower ends of these bars 7 are secured to the plow near its side edges so as to leave the centre portion of the plow free from obstruction. These bars 7 are connected at their upper ends by a cross bar 9 preferably round in cross section as shown and adapted to be readily grasped by the hand of the operator in raising the plow if desired, and also adapted to serve as a rest or support for the lines by which the draft animals are guided. The bars 7 are also connected about midway of their length by a cross bar 10 and to this cross bar is pivotally connected about midway between the bars 7, the forward end of a lifting lever 11 fulcrumed at 12 on a suitable cross bar supported by frames 13 extending upward from the side bars of the frame 1, the rear end of the lever 11 being adapted to be engaged by suitable stops 14 on the inner side of a vertical rod or bar 15 extending upward from a side bar of the frame 1 in rear of the seat 16 which is supported by a cross bar of the frame. By means of the lifting lever 11 the operator sitting in the seat 16 can readily lift the plow to the height desired and, by the engagement of the rear portion of the lever with one of the stops 14, the plow will be held against downward movement. The plow will usually drop of its own weight and when it is lowered so that its point enters the ground it will tend to bury itself and thus needs to be held only against downward movement. The cross bar 9 serves as a convenient means for applying such force as may be necessary to ensure the downward movement of the plow or for raising it independently of the lever 11. The plow is held against rearward movement by brace rods 17, one on each side, secured at their forward ends to the plow and pivotally connected at their rear ends to the side bars of the frame at points forward of the rear axle 5.

To the rear edge of the plow 6 are pivotally connected two, or more than two if desired, groups 18 and 19, of rearwardly extending rods, preferably three or more in each group, and preferably so arranged that the outer one of each group has its rear end somewhat elevated above that of the inner ones. These rods serve as screens to separate the potatoes from the earth taken up with them, the earth sifting down between the rods while the potatoes remain on them and pass rearward to drop off the rear ends. These screen rods may be stationary if desired but I prefer to have them alternately raised and lowered so as to shake the earth from the potatoes. To effect this shaking movement each group of screen rods is connected near the rear ends of the rods by a pitman 20 to a crank on a cross shaft 21 carried in bearings on suitable supports 22 extending upward from the side bars of the frame. There are two of these cranks, 23 and 24, on the cross shaft and they are oppositely arranged one being connected by a pitman 20 with one of the groups of screen rods and the other being connected by a pitman 20 with the other group, so that one group of screen rods will be raised while the other is being lowered.

The shaft 21 is provided midway of its length with a sprocket wheel 25 driven by sprocket chain 26 from a sprocket wheel on the rear axle 5. A suitable clutch 28 operated by a hand lever 29 is provided for connecting the sprocket wheel 27 with the axle.

Supported by brackets 30 and 31 on one of the vertical bars 7 is a vertical shaft 32 on which is mounted a pulley 33 carrying an eccentric 34. Pivoted to the vertical bar 7 is an arm 35 arranged to be operated by the eccentric 34. The free end of this arm 35 is bent rearward as shown in Figure 5 and is serrated on its rear edge and smooth on its forward edge. The pulley 33 is arranged to be driven by a belt 36 from a pulley 37 on the cross shaft 21, or if preferred a pulley on the axle 5, the belt being, of course, twisted as shown. As the pulley 33 is rotated the eccentric 34 will cause the arm 35 to swing back and forth on its pivot on the bar 7, its free end describing a considerable arc and, its forward edge being smooth, will, in its forward movement, pass readily over the potato tops and, on its rearward movement, will, by reason of its serrations, engage the potato tops and sweep them to one side out of the way of the plow this movement also serving to loosen the potatoes to at least a slight extent and thus facilitate their separation from the earth enclosing them.

The machine in operation is drawn forward astride of a row of potatoes and as it starts on a row the plow is allowed to drop, it being carried in raised position while the machine is being brought to the field. As the plow is lowered it swings on the pivots of the brace rods 17 so that it is inclined at an angle to the horizontal depending on the depth to which it is lowered, and tends to bury itself in the ground, the depth to which it buries itself being regulated by the lever 11 in engagement with a stop 14 of the bar 15. As the machine is drawn forward the plow will lift the potatoes, the tops being swept to one side by the arm 35, and with more or less earth the potatoes will pass onto the screen rods which, by their reciprocation, shake out the earth and permit the potatoes to drop off their rear ends.

The potatoes freed from earth by the screen rods may be allowed to drop off the rear ends of these screen rods directly onto the ground but I prefer to provide means for delivering them to one side of the path of movement of the machine into the space between the rows. For this purpose I make use of the device illustrated in Figures 6 and 7. This device is arranged in rear of the screen rods and comprises a series of guide rods 40 arranged at an angle to the direction of the screen rods, preferably at about a right angle, the rear ends of the screen rods extending slightly over the forward one of the guide rods. These guide rods are preferably curved as shown in Figure 7 and are supported from the frame of the machine by vertical rods 41 and 42. Over these guide rods is arranged a series of endless belts 43, each one between the vertical planes of two of the guide rods, provided at suitable intervals with fingers 45 adapted to extend downward into the space between two of the guide rods. These endless belts are carried on rollers 46 and 47 and are driven by a roller 48 on a shaft 49 suitably supported from the frame of the machine and provided with a pulley 50 driven by a belt 51 from the rear axle 5.

As the potatoes pass off the rear ends of the screen rods 18 and 19 they fall onto the guide rods 40 and, sliding down the inclined end portions of these rods, are engaged by the fingers 45 and forced along the guide rods to be dropped off their ends onto the space between the rows.

If desired the screen rods 18 and 19 may be stationary to permit the potatoes to pass more readily onto the guide rods 40.

It will, of course, be understood that the machine described may be used for digging other things than potatoes and it will also be understood that many modifications in the details of construction may be made from that shown in the drawings.

It will, of course, be understood that the screen rods and guide rods will be spaced apart just sufficiently to permit earth to drop freely between them and to carry forward all the potatoes of sufficient size to be of value. These screen rods and particularly the guide rods 40 may be of wood and, if necessary to prevent any bruising of the potatoes, may be covered with rubber or leather.

Having thus described my invention what I claim is:

1. In a potato digger the combination with a frame mounted on wheels and adapted to be drawn over a row of potatoes, of a plow adapted to lift the potatoes, brace rods secured to the plow and pivoted at their rear ends to the frame, screen rods pivoted to the plow and extending rearward therefrom and means for supporting their rear ends, vertical bars secured to the plow and extending upwardly therefrom, a cross bar connecting the vertical bars, a lifting lever pivoted at its forward end to said cross bar and means for locking it to prevent depression of the plow, and means carried by one of the vertical bars for sweeping the potato tops to one side.

2. In a potato digger the combination with a frame mounted on wheels and adapted to be drawn over a row of potatoes, of a plow adapted to lift the potatoes, brace rods secured to the plow and pivoted at their rear ends to the frame, screen rods pivoted to the plow and extending rearward therefrom, and means for supporting their rear ends, vertical bars secured to the plow and extending upward therefrom, a lifting lever pivotally connected at its forward end to the vertical bars and means for locking it to prevent depression of the plow, and means carried by one of the vertical bars for sweeping the potato tops to one side comprising a vertical shaft journalled in brackets secured to the vertical bar, an arm pivoted to the vertical bar, and means carried by the vertical shaft for swinging the arm.

3. In a potato digger the combination of a frame mounted on wheels and adapted to be drawn over a row of potatoes, of a plow adapted to lift the potatoes, brace rods secured to the plow and pivoted at their rear ends to the frame, screen rods pivoted to the plow and extending rearward therefrom, and means for supporting their rear ends, vertical bars secured to the plow and extending upward therefrom, a lifting lever pivotally connected at its forward end to the vertical bars and means for locking it to prevent depression of the plow, and means carried by one of the vertical bars for sweeping the potato tops to one side comprising a vertical shaft journalled in brackets secured to the vertical bar, an arm pivoted to the vertical bar, and means carried by the vertical shaft for swinging the arm, said arm being bent rearward at its free end, smooth on its forward edge and serrated on its rear edge.

4. In a potato digger the combination with a frame mounted on wheels and adapted to be drawn over a row of potatoes, of a plow adapted to lift the potatoes, brace rods secured to the plow and pivoted at their rear ends to the frame, screen rods pivoted at their forward ends to the plow and extending rearward therefrom, vertical bars secured to the plow and extending upward therefrom and means connected with said vertical bars for raising the plow and holding it against depression, and means in rear of the screen rods for delivering the potatoes to one side of the path of movement of the machine.

5. In a potato digger the combination with a frame mounted on wheels and adapted to be drawn over a row of potatoes, of a plow adapted to lift the potatoes, brace rods secured to the plow and pivoted at their rear ends to the frame, screen rods extending rearward from the plow, vertical bars secured to the plow and extending upward therefrom and means connected with said vertical bars for raising the plow and holding it against depression, and means in rear of the screen rods for delivering the potatoes to one side of the path of movement of the machine comprising a series of guide rods arranged to receive the potatoes from the screen rods, and means for moving the potatoes along said guide rods.

In testimony whereof I affix my signature this 21st day of May 1921.

FRANC A. YANTZ.